United States Patent
Kumasaka et al.

(10) Patent No.: US 9,935,543 B2
(45) Date of Patent: Apr. 3, 2018

(54) DIGITAL CONTROL POWER CIRCUIT, CONTROL CIRCUIT THEREOF, CONTROL METHOD, AND ELECTRONIC DEVICE USING THE SAME

(71) Applicant: ROHM CO., LTD., Ukyo-ku, Kyoto (JP)

(72) Inventors: Hiroyuki Kumasaka, Kyoto (JP); Nobuyuki Suzukawa, Kyoto (JP); Yoshihisa Sakano, Kyoto (JP); Sachito Horiuchi, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/172,815

(22) Filed: Jun. 3, 2016

(65) Prior Publication Data

US 2016/0359410 A1 Dec. 8, 2016

(30) Foreign Application Priority Data

Jun. 4, 2015 (JP) ................................. 2015-113996

(51) Int. Cl.
G05F 1/00 (2006.01)
H02M 3/157 (2006.01)
H02M 1/00 (2006.01)
H02M 3/156 (2006.01)

(52) U.S. Cl.
CPC .... H02M 3/157 (2013.01); *H02M 2001/0025* (2013.01); *H02M 2003/1566* (2013.01)

(58) Field of Classification Search
CPC ...................................................... G05F 1/575

USPC .......................... 323/241, 266, 274, 283, 284
See application file for complete search history.

(56) References Cited

U.S. PATENT DOCUMENTS

| | | | | |
|---|---|---|---|---|
| 2008/0284397 | A1* | 11/2008 | Chang | H02M 3/157 323/283 |
| 2008/0303501 | A1* | 12/2008 | Prodic | H02M 3/157 323/283 |
| 2011/0285373 | A1* | 11/2011 | Matsui | H03K 5/06 323/283 |
| 2012/0056605 | A1* | 3/2012 | Ooba | H02M 3/157 323/271 |
| 2013/0132451 | A1* | 5/2013 | Takahashi | G06F 17/10 708/200 |

FOREIGN PATENT DOCUMENTS

JP          2003284322 A     10/2003

* cited by examiner

*Primary Examiner* — Gary Nash
(74) *Attorney, Agent, or Firm* — Cantor Colburn LLP (57) ABSTRACT

A control circuit of a digital control power circuit is provided. The control circuit includes a feedback controller configured to generate a digital duty command value such that a digital feedback value corresponding to an output voltage of the digital control power circuit is close to a target value thereof, a pulse generator configured to generate a pulse signal having a duty ratio corresponding to the digital duty command value, a non-linear controller configured to correct a pulse width of the pulse signal when a variation in the output voltage is detected, and a driver configured to drive a switching device of the digital control power circuit depending on the pulse signal.

21 Claims, 9 Drawing Sheets

DIGITAL CONTROL POWER CIRCUIT, CONTROL CIRCUIT THEREOF, CONTROL METHOD, AND ELECTRONIC DEVICE USING THE SAME

This application is based upon and claims the benefit of priority from Japanese Patent Application No. 2015-113996, filed on Jun. 4, 2015, the entire contents of which are incorporated herein by reference.

TECHNICAL FIELD

The present disclosure relates to a digital control power circuit.

BACKGROUND

In order to generate a voltage lower or higher than a given input voltage, a power circuit such as a DC/DC converter (switching regulator) is used. The power circuit includes an analog control-type power circuit and a digital control-type power circuit. In the analog control-type power circuit, an error between an output voltage of the power circuit and a target value of the power circuit is amplified by an error amplifier, and then a duty ratio of switching is controlled depending on an output of the error amplifier, thereby stabilizing the output voltage to the target vale. In the digital control-type power circuit, an output voltage of the power circuit is converted into a digital value by an A/D converter, and then a duty ratio of a switching transistor is controlled through digital signal processing.

The digital control-type power circuit (digital control power circuit) is not greatly restricted in a control algorithm, so that a degree of freedom of design is high, and there is also advantage that a control scheme or a set value of an output voltage can be changed by software. Further, there is an advantage that can hold the history of various types of data as digital values on the occasion of a long-term operation.

Figure 1:
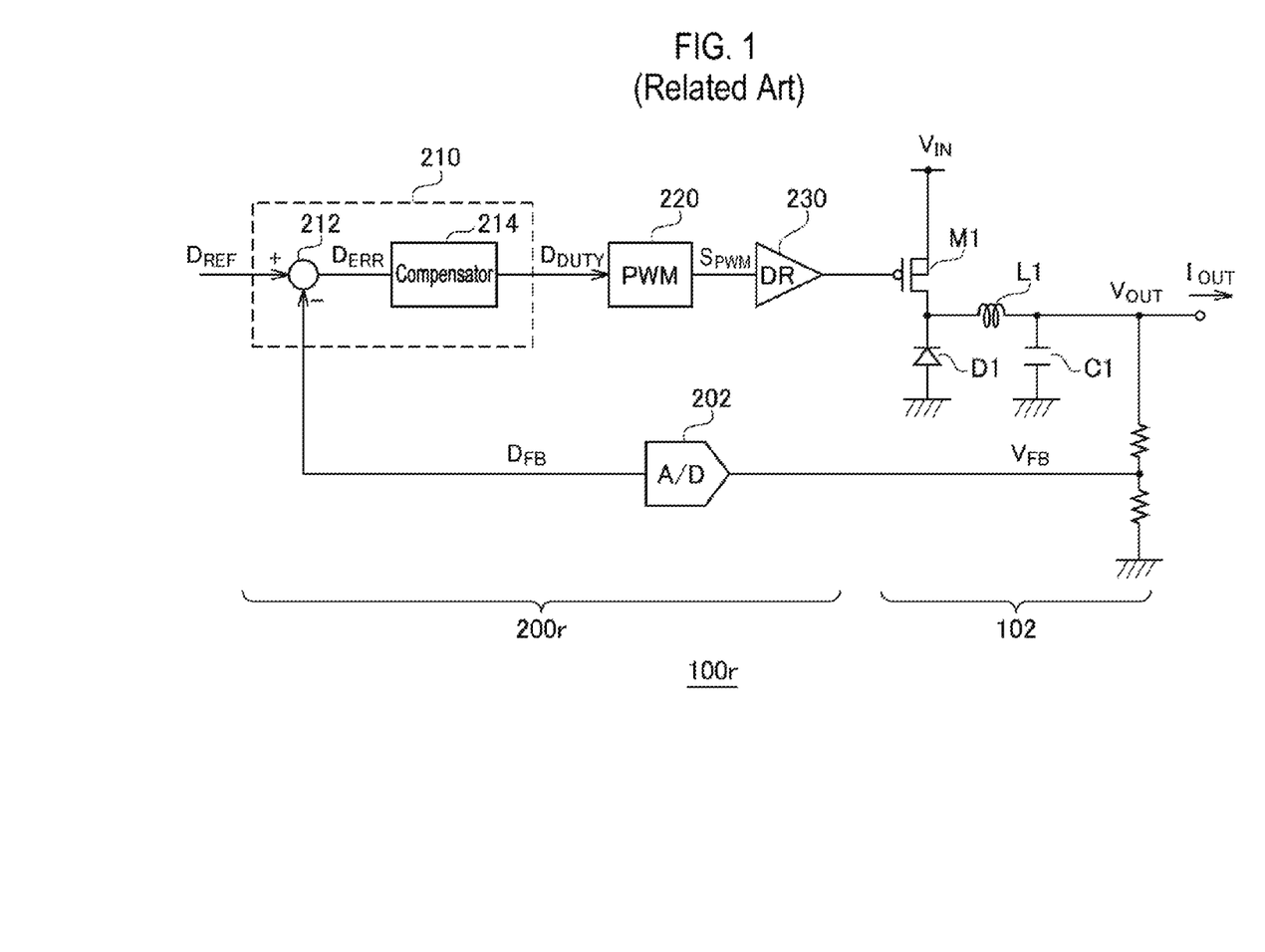
FIG. 1 is a block diagram of a digital control power circuit.

FIG. 1 is a block diagram of a digital control power circuit. A power circuit 100r includes an output circuit 102 and a control circuit 200r. The output circuit 102 includes a switching transistor M1, an inductor L1, a rectifying device D1, and an output capacitor C1.

An A/D converter 202 converts a feedback voltage $V_{FB}$ corresponding to an output voltage $V_{OUT}$ into a digital feedback value $D_{FB}$. An error detector 212 of a feedback controller 210 generates an error signal $D_{ERR}$ indicating an error between the digital feedback value $D_{FB}$ and a target value $D_{REF}$. A compensator 214 generates a duty command value $D_{DUTY}$ which is changed such that the error signal $D_{ERR}$ is close to zero. A pulse generator 220 generates a pulse signal $S_{PWM}$ having a duty ratio corresponding to the duty command value $D_{DUTY}$. A driver 230 switches the switching transistor M1 depending on the pulse signal $S_{PWM}$.

Figure 2:
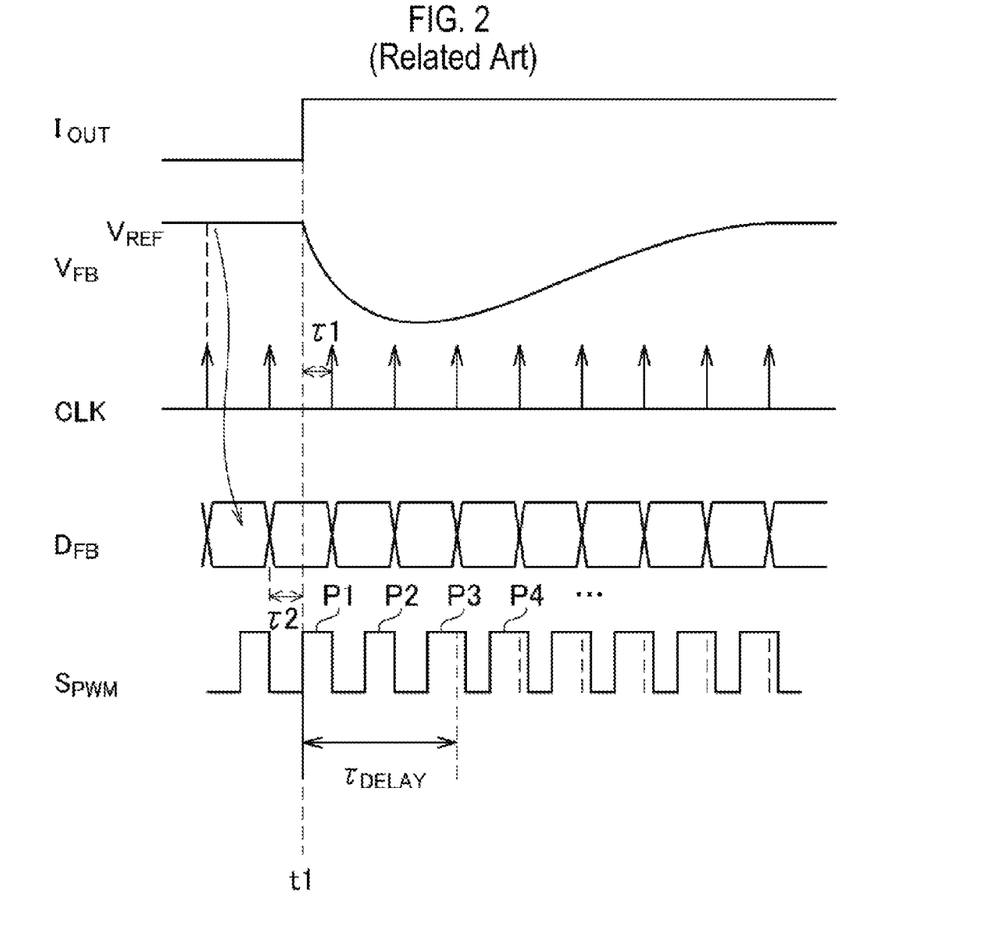
FIG. 2 is an operational waveform view of the power circuit of FIG. 1.

FIG. 2 is an operational waveform view of the power circuit 100r of FIG. 1. When a load current $I_{OUT}$ is rapidly increased at a time t1, the charge of an output capacitor C1 is discharged, so that the output voltage $V_{OUT}$ is reduced. There is a delay $\tau_1$ until the variation in the output voltage $V_{OUT}$ appears in a sampled feedback value $D_{FB}$. Further, when the variation in the output voltage $V_{OUT}$ appears in the feedback value $D_{FB}$, the error signal $D_{ERR}$ is increased, but there is a calculation delay $\tau_2$ until the error signal $D_{ERR}$ is reflected into a duty ratio of the pulse signal $S_{PWM}$. In addition, due to a delay (not shown in FIG. 2) of the compensator 214, the duty ratio follows the error signal $D_{ERR}$ later.

In this manner, since the power circuit 100r samples the output voltage $V_{OUT}$ at a predetermined sampling rate, the power circuit 100r is discontinuously controlled and may have low responsiveness compared with an analog control power circuit which does not require sampling and thus can be continuously controlled. In the example of FIG. 2, after the feedback voltage $V_{FB}$ is lowered, the duty ratio is finally varied at a third pulse P3. That is, there is a great response delay $\tau_{DELAY}$, which cannot be neglected, from a time at which the feedback voltage $V_{FB}$ varies to a time at which the duty ratio of the pulse signal $S_{PWM}$ increases, and thus, a variation in the output voltage $V_{OUT}$ is increased.

SUMMARY

The present disclosure provides some embodiments of a digital control power circuit having improved responsiveness, and a control circuit thereof.

According to one embodiment of the present disclosure, there is provided a control circuit of a digital control power circuit. The control circuit includes a feedback controller configured to generate a digital duty command value such that a digital feedback value corresponding to an output voltage of the digital control power circuit is close to a target value thereof; a pulse generator configured to generate a pulse signal having a duty ratio corresponding to the digital duty command value; a non-linear controller configured to correct a pulse width of the pulse signal when a variation in the output voltage is detected; and a driver configured to drive a switching device of the digital control power circuit depending on the pulse signal.

According to this embodiment, it is possible to suppress a variation in the output voltage by correcting the pulse width with low delay by the non-linear controller.

When the output voltage varies to a positive side, the non-linear controller may be configured to reduce the pulse width of the pulse signal. Also, when the output voltage varies to a negative side, the non-linear controller may be configured to increase the pulse width of the pulse signal.

The non-linear controller may include an analog assist circuit configured to monitor an analog feedback voltage corresponding to the output voltage and, when a variation range of the feedback voltage exceeds a predetermined threshold voltage, correct the pulse width of the pulse signal. With a continuously controlled analog circuit, a high speed correction which does not depend upon sampling is possible and responsiveness can be increased.

The analog assist circuit may include: an analog comparator configured to compare an alternating current (AC) component of the feedback voltage with the threshold voltage; and a first correction amount generating part configured to correct the pulse width of the pulse signal depending on an output of the analog comparator.

The first correction amount generating part may be configured to generate a duty correction value corresponding to a correction amount of the pulse width to increase or reduce the duty command value. It is possible to correct the pulse width of the pulse signal by increasing or reducing the duty command value.

The pulse generator may be configured to be reset immediately when a correction of the pulse with of the pulse signal is made by the analog assist circuit during an OFF time at which the pulse signal has an OFF level. Thus, the pulse signal having a pulse width with the correction made can be immediately generated in a next cycle, so that responsiveness can be increased.

The non-linear controller may be configured to stop correcting a new pulse width during a predetermined mask time after the pulse width of the pulse signal is corrected once. Thus, overcorrection of the duty command value and an influence of a variation resulting from the correction of the output voltage can be prevented.

The non-linear controller may include a digital non-linear controller configured to monitor the feedback value and, when a variation range of the feedback value exceeds a predetermined threshold value, correct the pulse width of the pulse signal. Responsiveness can be increased by correcting the pulse width by a high speed digital circuit without using a compensator.

The digital non-linear controller may include: a digital comparator configured to compare a difference between a feedback value prior to one sampling and the current feedback value with a predetermined threshold value; and a second correction amount generating part configured to correct the pulse width of the pulse signal depending on an output of the digital comparator.

The second correction amount generating part may be configured to increase or reduce the duty command value.

The feedback controller may include: an error detector configured to generate an error signal indicating an error between the feedback value and a target value thereof; and a compensator configured to generate the duty command value based on the error signal.

The error detector may be a digital comparator, and the compensator may be configured to generate the duty command value based on any combination of proportional (P) controlling, integral (I) controlling, and differential (D) controlling.

When a variation in the output voltage is detected, the non-linear controller may be configured to correct the duty command value. The pulse generator may be configured to generate the pulse signal depending on the duty command value after the correction.

When a variation in the output voltage is detected, the non-linear controller may be configured to generate a correction pulse corresponding to a correction amount of the pulse width of the pulse signal and synthesize the correction pulse with the pulse signal generated by the pulse generator to correct the pulse width.

A correction amount of the pulse width of the pulse signal per one cycle may be a fixed value. A correction amount of the pulse width of the pulse signal per cycle may be a variable amount corresponding to a variation in the output voltage.

The control circuit may be integrated on a single semiconductor substrate. The term "integrated" may include a case in which all the components of a circuit are formed on a semiconductor substrate or a case in which major components of a circuit are integrated, and some resistors, capacitors, or the like for adjusting circuit constants may be provided outside the semiconductor substrate.

According to another embodiment of the present disclosure, there is provided a digital control power circuit. The digital control power circuit includes any one of the control circuits as described above.

According to still another embodiment of the present disclosure, there is provided an electronic device. The electronic device includes the digital control power circuit as described above.

Also, arbitrarily combining the foregoing components or replacing the expression of the present disclosure among a method, an apparatus, and the like is also effective as an embodiment of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Also, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically and directly connected to each other or even in a case where the member A and the member B are indirectly connected through any other member that does not affect an electrical connection state thereof. Also, "a state where a member C is installed between a member A and a member B" also includes a case where the member A and the member C or the member B and the member C are indirectly connected through any other member that does not affect an electrical connection state, in addition to a case in which the member A and the member C or the member B and the member C are directly connected.

Figure 3:
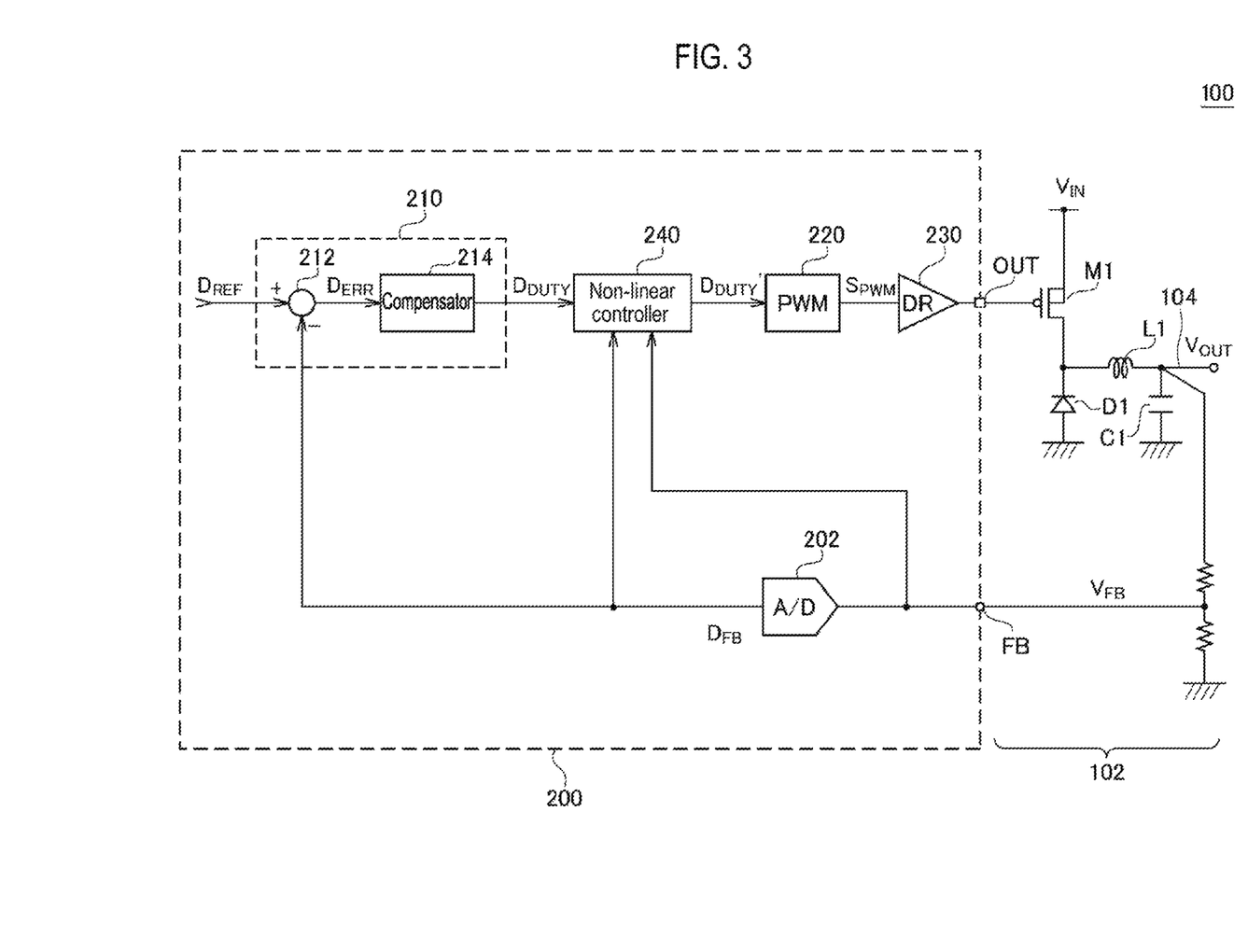
FIG. 3 is a block diagram of a digital control power circuit according to an embodiment.

FIG. 3 is a block diagram of a digital control power circuit (hereinafter, simply referred to as a "power circuit") 100 according to an embodiment. The power circuit 100 includes a control circuit 200 and an output circuit 102.

The output circuit 102 includes some circuit components and wires, which are provided outside the control circuit 200. The output circuit 102 has at least a switching transistor M1 and an inductor L1. In FIG. 3, the output circuit of a step-down DC/DC converter is illustrated and further includes a rectifying device D1 and an output capacitor C1, in addition to the switching transistor M1 and the inductor L1. An output voltage $V_{OUT}$ stepped down from an input voltage $V_{IN}$ is generated in an output line 104 according to switching of the switching transistor M1.

Next, the control circuit 200 will be described.

The control circuit 200 includes an A/D converter 202, a feedback controller 210, a pulse generator 220, a driver 230, and a non-linear controller 240, and is a functional integrated circuit (IC) integrated on a single semiconductor substrate. The control circuit 200 may be a part of a general-purpose microcomputer or may be an application specific IC (ASIC) designed for dedicated purpose. Also, each block illustrated in FIG. 3 and other drawings may be configured by a dedicated hardware or may be configured as a processor for executing a software program.

An analog feedback voltage $V_{FB}$ corresponding to the output voltage $V_{OUT}$ is input to a feedback (FB) terminal of the control circuit 200. Also, an output (OUT) terminal is connected to a gate of the switching transistor M1.

The A/D converter 202 samples the feedback voltage $V_{FB}$ having a voltage level corresponding to the output voltage $V_{OUT}$ of the digital control power circuit, and converts the sampled feedback voltage $V_{FB}$ into a digital feedback value $D_{FB}$. For example, the feedback voltage $V_{FB}$ is a voltage divided from the output voltage $V_{OUT}$ by resistance dividing circuits R1 and R2 of the output circuit 102. A sampling period of the A/D converter 202 may be the same as a switching period of the switching transistor M1.

The feedback controller 210 generates a digital duty command value $D_{DUTY}$ such that the feedback value $D_{FB}$ is close to a target value $D_{REF}$.

The pulse generator 220 generates a pulse signal $S_{PWM}$ having a duty ratio corresponding to the duty command value $D_{DUTY}$. The pulse generator 220 may be recognized as a duty pulse converter. The driver 230 switches the switching transistor M1 depending on the pulse signal $S_{PWM}$.

When a variation in the output voltage $V_{OUT}$ is detected, the non-linear controller 240 corrects a pulse width (ON time) of the pulse signal $S_{PWM}$, i.e., a duty ratio. When the output voltage $V_{OUT}$ varies to a positive side, the non-linear controller 240 reduces a pulse width $T_{ON}$ by a predetermined amount $\Delta T$, and conversely, when the output voltage $V_{OUT}$ varies to a negative side, the non-linear controller 240 increases the pulse width $T_{ON}$ by a predetermined amount $\Delta T$.

In this embodiment, the non-linear controller 240 corrects the pulse width by correcting the duty command value $D_{DUTY}$ generated by the feedback controller 210. The non-linear controller 240 may reduce the duty command value $D_{DUTY}$ when the output voltage $V_{OUT}$ has been varied to the positive side, and conversely increase the duty command value $D_{DUTY}$ when the output voltage $V_{OUT}$ has been varied to the negative side. When a correction is made by the non-linear controller 240, the duty ratio of the pulse signal $S_{PWM}$ generated by the pulse generator 220 is set depending on a duty command value $D_{DUTY}$, after the correction.

Figure 4:
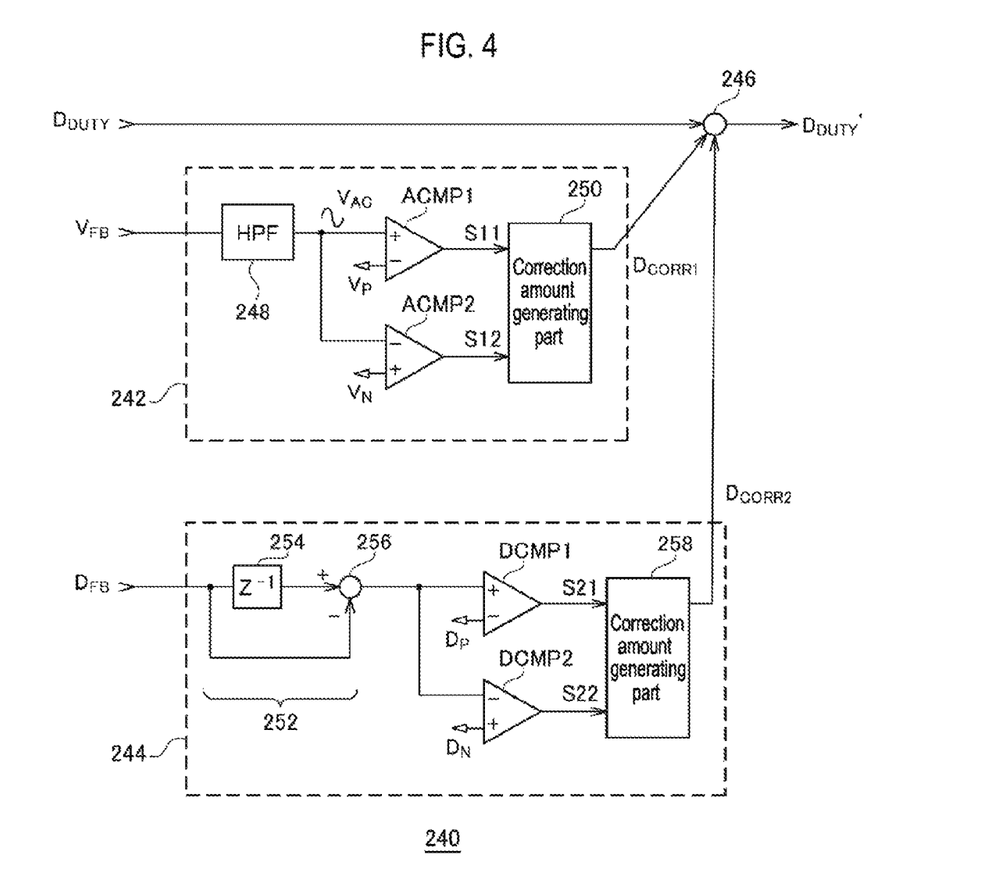
FIG. 4 is a block diagram illustrating a configuration example of a non-linear controller.

FIG. 4 is a block diagram illustrating a configuration example of the non-linear controller 240.

The non-linear controller 240 includes an analog assist circuit 242 and a digital non-linear controller 244.

The analog assist circuit 242 monitors the analog feedback voltage $V_{FB}$ depending on the output voltage $V_{OUT}$, and when a variation range of the feedback voltage $V_{FB}$ exceeds a predetermined threshold voltage, the analog assist circuit 242 corrects the duty command value $D_{DUTY}$.

Specifically, the analog assist circuit 242 includes a high pass filter (HPF) 248, analog comparators ACMP1 and ACMP2, and a first correction amount generating part 250. The HPF 248 allows an alternating current (AC) component of the feedback voltage $V_{FB}$ to pass therethrough. The HPF 248 may be a direct current (DC) blocking capacitor or may be a second order or higher order HPF or a band pass filter.

The analog comparator ACMP1 compares the AC component $V_{AC}$ of the feedback voltage $V_{FB}$ with a positive side threshold voltage $V_p$. When the AC component $V_{AC}$ exceeds the threshold voltage $V_p$, an output (called a correction signal) S11 of the analog comparator ACMP1 is asserted (for example, becomes a high level). Also, the analog comparator ACMP2 compares the AC component of the feedback voltage $V_{FB}$ with a negative side threshold voltage $V_N$. When the AC component $V_{AC}$ is lower than the threshold voltage $V_N$, an output S12 of the analog comparator ACMP2 is asserted (for example, becomes a high level). The analog comparator ACMP1 and the analog comparator ACMP2 may be recognized as an AC coupling comparator.

The first correction amount generating part 250 generates a correction value $D_{CORR1}$ depending on the outputs S11 and S12 of the analog comparators ACMP1 and ACMP2. For example, when the signal S11 is asserted, the first correction amount generating part 250 may output a negative correction value $D_{CORR1}$, and when the signal S12 is asserted, the first correction amount generating part 250 may output a positive correction value $D_{CORR1}$. The correction value $D_{CORR1}$ may be a fixed value that can be set by a register. An adder/subtractor 246 adds (or subtracts) the correction value $D_{CORR1}$ to or from the duty command value $D_{DUTY}$ from the feedback controller 210 to correct the duty command value $D_{DUTY}$.

The digital non-linear controller 244 monitors the digital feedback value $D_{FB}$, and when a variation range $\Delta D_{FB}$ of the feedback value $D_{FB}$ exceeds a predetermined threshold value, the digital non-linear controller 244 corrects the duty command value $D_{DUTY}$.

The digital non-linear controller 244 includes a difference detector 252, digital comparators DCMP1 and DCMP2, and a second correction amount generating part 258.

The difference detector 252 generates a difference $\Delta D_{FB}$ between a previous feedback value $D_{FB'}$ prior to one sampling and a current feedback value $D_{FB}$. The difference $\Delta D_{FB}$ corresponds to the variation range $\Delta D_{FB}$ of the feedback value $D_{FB}$, and may also be recognized as a slope of the feedback value $D_{FB}$. The difference detector 252 may include a delay 254 and a subtractor 256.

The digital comparator DCMP1 compares the difference $\Delta D_{FB}$ with a predetermined positive side threshold value $D_p$. When the variation range $\Delta D_{FB}$ exceeds the threshold value $D_p$, an output (correction signal) S21 of the digital comparator DCMP1 is asserted (for example, becomes 1). Also, the digital comparator DCMP2 compares the difference $\Delta D_{FB}$ with a predetermined negative side threshold value $D_N$. When the variation range $\Delta D_{FB}$ is lower than the threshold value $D_N$, an output S22 of the digital comparator DCMP2 is asserted (for example, becomes 1).

The second correction amount generating part 258 generates a correction value $D_{CORR2}$ depending on the outputs S21 and S22 of the digital comparators DCMP1 and DCMP2. For example, when the signal S21 is asserted, the second correction amount generating part 258 may output a negative correction value $D_{CORR2}$, and when the signal S22 is asserted, the second correction amount generating part 258 may output a positive correction value $D_{CORR2}$. The correction value $D_{CORR2}$ may be a fixed value that can be set by a register. The adder/subtractor 246 adds (or subtracts) the correction value $D_{CORR2}$ to or from the duty command value $D_{DUTY}$ from the feedback controller 210 to correct the duty command value $D_{DUTY}$.

After performing a correction of the duty ratio one time, the non-linear controller 240 stops correcting the duty ratio during a predetermined mask time $T_{MSK}$. Specifically, after a correction is performed by the analog assist circuit 242, the correction values $D_{CORR1}$ and $D_{CORR2}$ of the duty ratio by the analog assist circuit 242 and the digital non-linear controller 244 are zero during the mask time $T_{MSK}$, regardless of the correction signal S11, S12, S21, or S22. A length of the mask time $T_{MSK}$ is not particularly limited and may be, for example, one period to a few periods of PWM.

Figure 5:
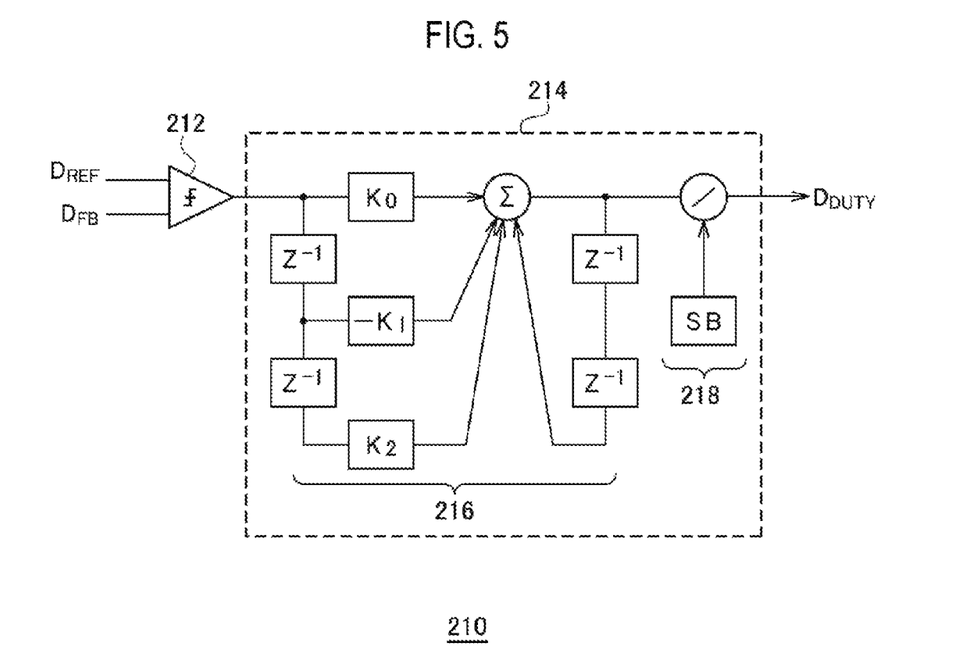
FIG. 5 is a block diagram illustrating a configuration example of a feedback controller.

FIG. 5 is a block diagram illustrating a configuration example of the feedback controller 210. The error detector 212 is a digital comparator for comparing the digital feedback value $D_{FB}$ with the target value $D_{REF}$. The compensator 214 includes a proportional integral differential (PID) compensator 216 and a bit shifter 218. In the PID compensator 216, $Z^{-1}$ represents a delay, and $K_0$ to $K_2$ represent coefficient multipliers. The bit shifter 218 truncates least significant bits of an output from the PID compensator 216 and fits it to a bit width of the pulse generator 220 at a next stage.

The configuration of the power circuit 100 including the control circuit 200 according to the embodiment has been described above.

Figure 6:
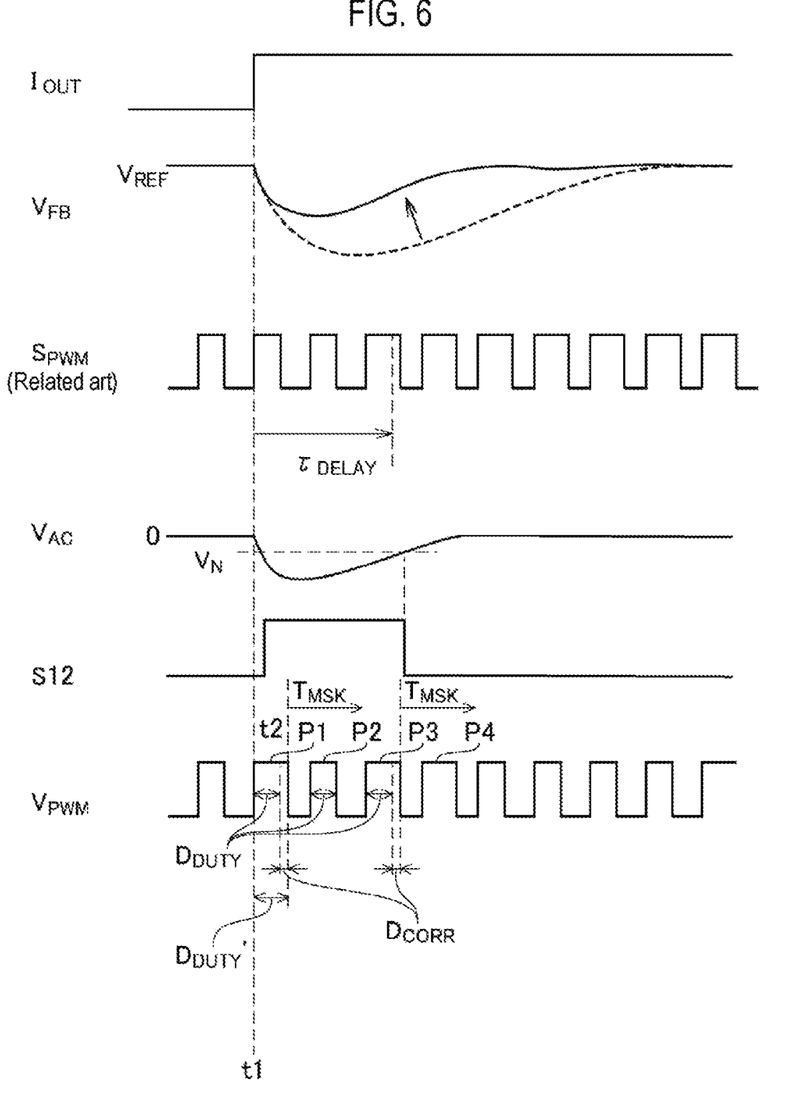
FIG. 6 is a view illustrating a correction of a duty ratio by a non-linear controller.

FIG. 6 is a view illustrating a correction of a duty ratio by the non-linear controller 240. Here, the load variation as illustrated in FIG. 2 is considered. The feedback voltage $V_{FB}$ of the broken line of FIG. 6 is a feedback voltage of the conventional power circuit 100r illustrated in FIG. 2, and $S_{PWM'}$ of FIG. 6 is that of the conventional power circuit 100r illustrated in FIG. 2.

Here, the correction performed by the analog assist circuit 242 will be described. When the feedback voltage $V_{FB}$ is lowered, an AC component thereof varies and the correction signal S12 is asserted by the analog assist circuit 242 at a time t2. In response to the assertion of the correction signal S12, the positive correction value $D_{CORR}$ is output immediately at a first pulse P1 after a time t1, and a duty ratio (pulse width) $D_{DUTY'}$ of the pulse P1 is more increased by the correction value $D_{CORR}$ than the duty command value $D_{DUTY}$ indicated by the feedback controller 210. As a result, ON time of the switching transistor M1 is lengthened and an amount of current supplied from the inductor L1 to the output capacitor C1 is increased more than that of the related art power circuit 100r. Accordingly, lowering of the feedback voltage V (i.e., output voltage $V_{OUT}$) is suppressed.

Thereafter, the correction signal S12 is continuously asserted even at a period of a second pulse P2, but the correction is not performed during a mask time $T_{MSK}$ after the correction of the pulse P1. Subsequently, since the mask time $T_{MSK}$ is terminated at a period of a third pulse P3, the duty ratio is again corrected.

When the output voltage $V_{OUT}$ is increased, the pulse width of the pulse signal $S_{PWM}$ is immediately narrowed by the analog assist circuit 242 to suppress the increase in the output voltage $V_{OUT}$. The correction by the digital non-linear controller 244 is performed in the same manner as that of the analog assist circuit 242.

Other characteristics of the non-linear controller 240 will be described.

Figure 7A:
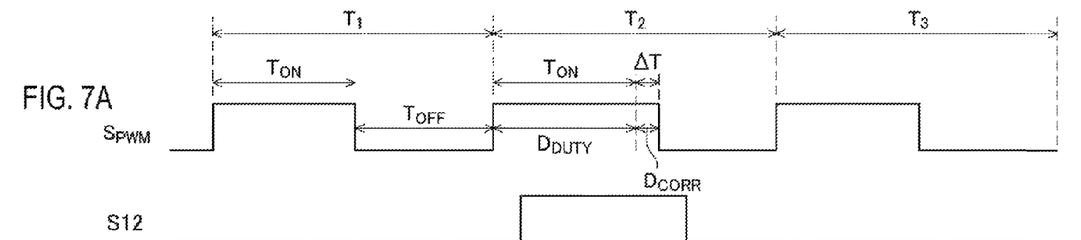
FIGS. 7A to 7C are views illustrating a correction of a duty ratio by an analog assist circuit.
Figure 7B:
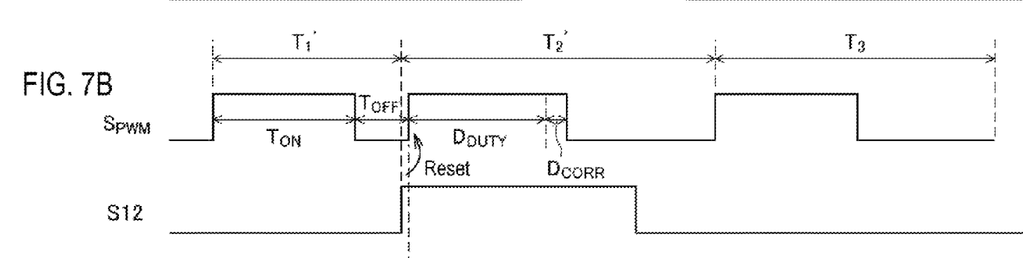
Figure 7C:
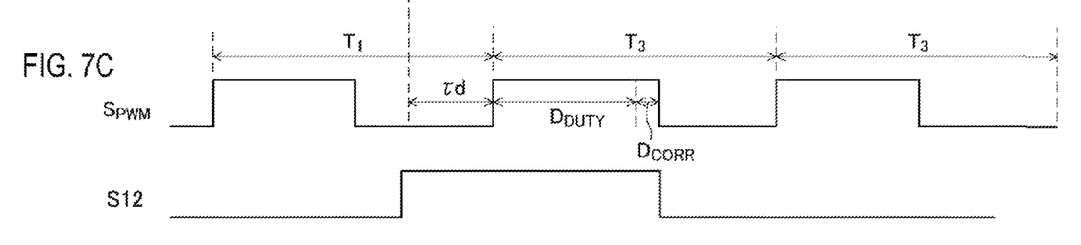

FIGS. 7A to 7C are views illustrating a correction of a duty ratio by the analog assist circuit 242. FIG. 7A illustrates a case in which a duty ratio is corrected (correction signals S11 and S12 are asserted) at a period during which the pulse signal $S_{PWM}$ has a high level (ON time $T_{ON}$). In this case, a trailing edge (negative edge) of the currently output pulse signal $S_{PWM}$ is delayed or accelerated, and thus a pulse width (duty ratio) is corrected.

FIG. 7B illustrates a case in which a duty ratio is corrected at a period during which the pulse signal has a low level (OFF time $T_{OFF}$). In this case, the period of the pulse generator 220 is reset according to assertion of the correction signal S12, and generation of a pulse of a next cycle $T_2$ is immediately started.

FIG. 7C illustrates an operation in a case in which the pulse generator 220 is not reset when the correction of a duty ratio is made in the OFF period $T_{OFF}$. In this case, a delay τd occurs until a duty ratio is corrected, which results in damaging high speed responsiveness as an advantage of the analog assist circuit 242. As illustrated in FIG. 7B, a pulse signal having a corrected duty ratio can be generated immediately by resetting the period of the pulse generator 220, thereby enhancing responsiveness.

The present disclosure has been described above with reference to the embodiments. It is to be understood by those skilled in the art that the embodiments are merely illustrative and may be variously modified by any combination of the components or processes, and the modifications are also within the scope of the present disclosure. Hereinafter, these modifications will be described.

(First Modification)

In the embodiment, it has been described that the non-linear controller 240 is constituted with the hybrid circuit of the analog assist circuit 242 and the digital non-linear controller 244, but the non-linear controller 240 may be constituted with only the analog assist circuit 242 or only the digital non-linear controller 244.

(Second Modification)

In the embodiment, it has been described that the scheme of adding or subtracting the duty correction value $D_{CORR}$ to or from the duty command value $D_{DUTY}$ is employed to correct the pulse width of the pulse signal $S_{PWM}$ by the non-linear controller 240, but the present disclosure is not limited thereto.

Figure 8:
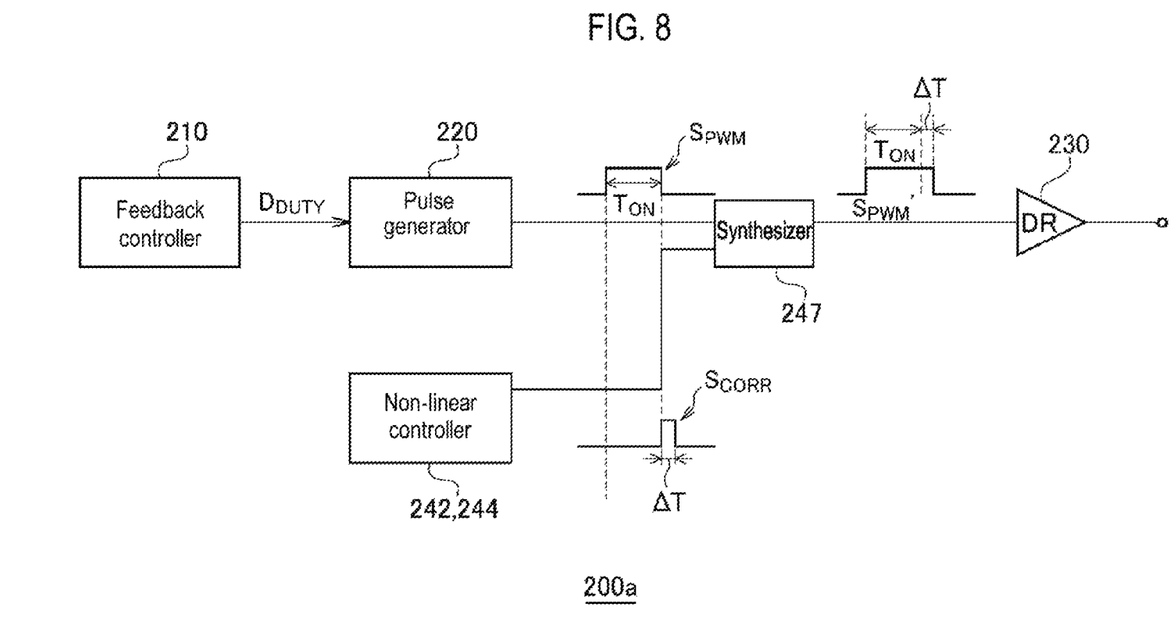
FIG. 8 is a block diagram of a control circuit according to a second modification.

FIG. 8 is a block diagram of a control circuit 200a according to a second modification. When a variation in the output voltage $V_{OUT}$ is detected, the non-linear controller 240 generates a correction pulse $S_{CORR}$ corresponding to a correction amount ΔT of a pulse width of the pulse signal $S_{PWM}$ and synthesizes the correction pulse $S_{CORR}$ with the pulse signal $S_{PWM}$ generated by the pulse generator 220 to generate a pulse signal $S_{PWM'}$ having a corrected pulse width.

In this modification, a pulse synthesizer 247 may be configured with a combination of logic gates. For example, when it is desired to increase a pulse width, a logical sum (OR) gate may be used. Conversely, when it is desired to shorten a pulse width, a correction pulse $S_{CORR}$ having a low level may be generated for a time interval desired to be shortened, and a logical product (AND) of the correction pulse $S_{CORR}$ and the pulse signal $S_{PMW}$ may be calculated. In the present disclosure, the scheme of correcting a pulse width is not limited and various modifications may be used.

(Third Modification)

The feedback controller 210 of FIG. 5 is merely an example. As the error detector 212, a subtractor may be used. Also, as the compensator 214, a compensator having any combination of proportional (P) controlling, integral (I) controlling, and differential (D) controlling, such as a P compensator or a PI compensator, may be used instead of the PID compensator.

(Fourth Modification)

In the embodiment, the step-down DC/DC converter has been described, but the topology of the output circuit 102 is not particularly limited. For example, a synchronous rectifying transistor may be provided instead of the rectifying device D1. Alternatively, the output circuit 102 may be a step-up type, step-up/step-down type, or voltage-inverting type converter, or may be a converter using a transformer instead of an inductor.

(Fifth Modification)

In the embodiment, both the increase and reduction in a pulse width are supported to correct a pulse width by the non-linear controller 240, but either one may also be used. In an application in which undershoot of the output voltage $V_{OUT}$ becomes problematic, only a function of increasing a pulse width may be implemented, and in an application in which overshoot of the output voltage $V_{OUT}$ becomes problematic, only a function of reducing a pulse width may be implemented.

(Sixth Modification)

The digital non-linear controller 244 of FIG. 4 corrects the pulse signal $S_{PWM}$ depending on a variation (slope) of the digital feedback value $D_{FB}$, but the present disclosure is not limited thereto. The digital non-linear controller 244 may also correct a pulse width even based on a variation of a slope of the feedback value $D_{FB}$.

(Applications of Power Circuit)

Figure 9A:
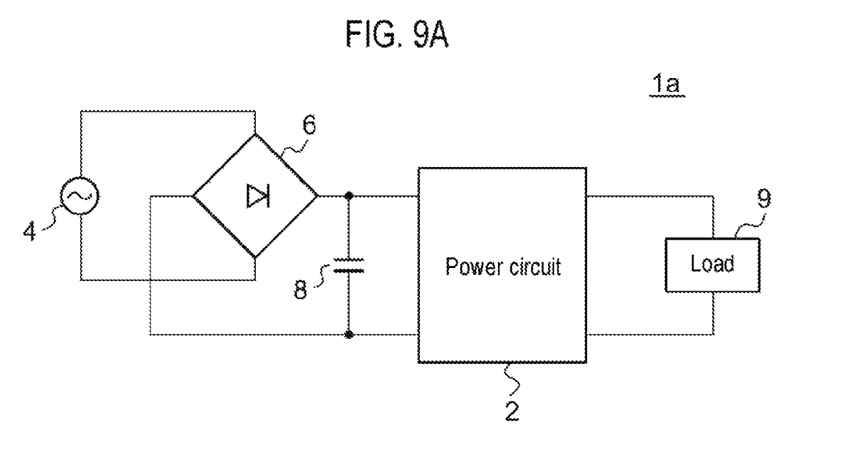
FIGS. 9A and 9B are block diagrams illustrating an electronic device including a digital control power circuit.
Figure 9B:
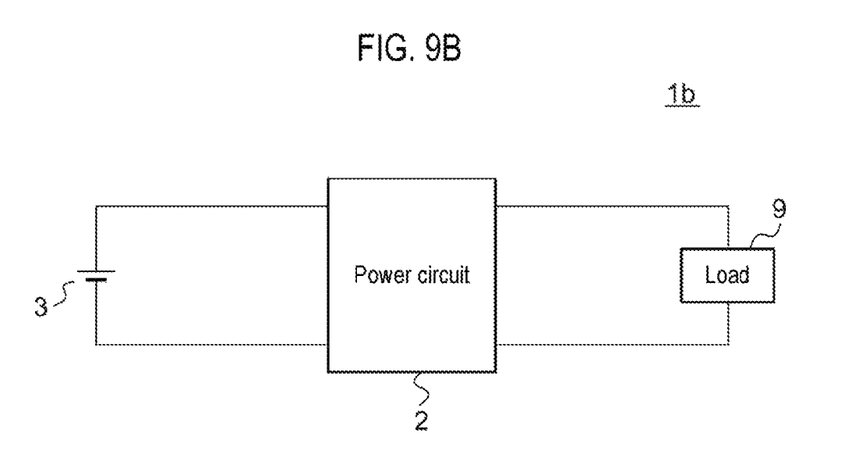

Finally, the applications of the power circuit 100 will be described. FIGS. 9A and 9B are block diagrams illustrating electronic devices including the power circuit 100. An electronic device 1a of FIG. 9A includes a bridge circuit 6 for rectifying an AC voltage of a commercial AC power 4, a smoothing capacitor 8, the above-described power circuit 10, and a load 9. In this case, as the power circuit 100, a non-insulating step-down, step-up, or step-up/step-down converter, or the like may be appropriately used. The load 9 may be, for example, a field programmable gate array (FPGA), a central processing unit (CPU), a graphics processing unit (GPU), and various microcomputers, and the like, but the present disclosure is not particularly limited thereto. The electronic device 1a may be, for example, a base station for mobile communication, a home appliance such as a TV, a PC, or a refrigerator, an OA machine such as a facsimile or a copy machine, a machine tool, or the like.

An electronic device 1b of FIG. 9B includes a battery 3, the above-described power circuit 2 receiving a voltage from the battery 3, and a load 9. As the electronic device 1b, a portable telephone terminal, a tablet PC, a digital camera, a digital video camera, or the like may be used. For example, the load 9 may be a microcomputer or a memory, a liquid crystal driver, a light emitting diode (LED) for a liquid crystal backlight, an LED for a flash of a camera, or the like.

According to the present disclosure in some embodiments, it is possible to improve the stability of a digital control power circuit.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a digital control power circuit, comprising:
    a feedback controller configured to generate a digital duty command value such that a digital feedback value corresponding to an output voltage of the digital control power circuit is close to a target value;
    a pulse generator configured to generate a pulse signal having a duty ratio corresponding to the digital duty command value;
    a non-linear controller configured to correct a pulse width of the pulse signal when a variation in the output voltage is detected; and
    a driver configured to drive a switching device of the digital control power circuit depending on the pulse signal,
    wherein the non-linear controller comprises an analog assist circuit configured to monitor an analog feedback voltage corresponding to the output voltage and, when a variation range of the analog feedback voltage exceeds a predetermined threshold voltage, correct the pulse width of the pulse signal.

2. The control circuit of claim 1, wherein when the output voltage varies to a positive side, the non-linear controller is configured to reduce the pulse width of the pulse signal.

3. The control circuit of claim 1, wherein when the output voltage varies to a negative side, the non-linear controller is configured to increase the pulse width of the pulse signal.

4. The control circuit of Claim 1, wherein the analog assist circuit comprises:
    an analog comparator configured to compare an alternating current (AC) component of the analog feedback voltage with the predetermined threshold voltage; and
    a first correction amount generating part configured to correct the pulse width of the pulse signal depending on an output of the analog comparator.

5. The control circuit of claim 4, wherein the first correction amount generating part is configured to generate a duty correction value corresponding to a correction amount of the pulse width to increase or reduce the digital duty command value.

6. The control circuit Claim 1, wherein the pulse generator is configured to be reset immediately when a correction of a pulse width of the pulse signal is made during an OFF time at which the pulse signal by the analog assist circuit has an OFF level.

7. The control circuit of claim 1, wherein the non-linear controller is configured to stop correcting a new pulse width during a predetermined mask time after the pulse width of the pulse signal is corrected one time.

8. The control circuit of claim 1, wherein the non-linear controller comprises a digital non-linear controller configured to monitor the digital feedback value and, when a variation range of the digital feedback value exceeds a predetermined threshold value, correct the pulse width of the pulse signal.

9. The control circuit of claim 8, wherein the digital non-linear controller comprises:
    a digital comparator configured to compare a difference between a digital feedback value prior to one sampling and a current digital feedback value with a predetermined threshold value; and
    a second correction amount generating part configured to correct the pulse width of the pulse signal according to an output of the digital comparator.

10. The control circuit of claim 9, wherein the second correction amount generating part is configured to increase or reduce the digital duty command value.

11. The control circuit of claim 1, wherein the feedback controller comprises:
    an error detector configured to generate an error signal indicating an error between the digital feedback value and a target value thereof; and a compensator configured to generate the digital duty command value based on the error signal.

12. The control circuit of claim 11, wherein the error detector is a digital comparator, and
the compensator is configured to generate the digital duty command value based on any combination of proportional (P) controlling, integral (I) controlling, and differential (D) controlling.

13. The control circuit of claim 1, wherein when a variation in the output voltage is detected, the non-linear controller is configured to correct the digital duty command value, and
the pulse generator is configured to generate the pulse signal depending on the digital duty command value after a correction.

14. The control circuit of claim 1, wherein, when a variation in the output voltage is detected, the non-linear controller is configured to generate a correction pulse corresponding to a correction amount of the pulse width of the pulse signal and synthesize the correction pulse with the pulse signal generated by the pulse generator to correct the pulse width.

15. The control circuit of claim 1, wherein a correction amount of the pulse width of the pulse signal per one cycle is a fixed value.

16. The control circuit claim 1, wherein the control circuit is integrated on a single semiconductor substrate.

17. A control method of a digital control power circuit, comprising:
generating a digital feedback value corresponding to an output voltage of the digital control power circuit;
generating a digital duty command value such that the digital feedback value is close to a target value thereof;
generating a pulse signal having a duty ratio corresponding to the digital duty command value;
correcting a pulse width of the pulse signal when a variation amount of an analog feedback voltage corresponding to the output voltage exceeds a threshold value; and
driving a switching device of the digital control power circuit depending on the pulse signal.

18. The method of claim 17, further comprising: correcting the digital duty command value when a variation range of the digital feedback value exceeds a predetermined threshold value.

19. A control method of a digital control power circuit, comprising:
generating a digital feedback value corresponding to an output voltage of the digital control power circuit;
generating a digital duty command value such that the digital feedback value is close to a target value thereof;
generating a pulse signal having a duty ratio corresponding to the digital duty command value;
correcting a pulse width of the pulse signal when a variation range of the digital feedback value exceeds a predetermined threshold value; and
driving a switching device of the digital control power circuit depending on the pulse signal,
wherein the act of correcting the pulse width of the pulse signal includes monitoring an analog feedback voltage corresponding to the output voltage and, when a variation range of the analog feedback voltage exceeds a predetermined threshold voltage, correcting the pulse width of the pulse signal.

20. A control circuit of a digital control power circuit, comprising:
a feedback controller configured to generate a digital duty command value such that a digital feedback value corresponding to an output voltage of the digital control power circuit is close to a target value;
a pulse generator configured to generate a pulse signal having a duty ratio corresponding to the digital duty command value;
a non-linear controller configured to correct a pulse width of the pulse signal when a variation in the output voltage is detected; and
a driver configured to drive a switching device of the digital control power circuit depending on the pulse signal,
wherein the non-linear controller is configured to stop correcting a new pulse width during a predetermined mask time after the pulse width of the pulse signal is corrected one time.

21. A control circuit of a digital control power circuit, comprising:
a feedback controller configured to generate a digital duty command value such that a digital feedback value corresponding to an output voltage of the digital control power circuit is close to a target value;
a pulse generator configured to generate a pulse signal having a duty ratio corresponding to the digital duty command value;
a non-linear controller configured to correct a pulse width of the pulse signal when a variation in the output voltage is detected; and
a driver configured to drive a switching device of the digital control power circuit depending on the pulse signal,
wherein when a variation in the output voltage is detected, the non-linear controller is configured to correct the digital duty command value, and
wherein the pulse generator is configured to generate the pulse signal depending on the digital duty command value after a correction.

* * * * *